May 31, 1927.
G. W. PAGE
1,630,800
AUTOMOBILE WRECKING CAR
Filed May 4, 1926
2 Sheets-Sheet 1
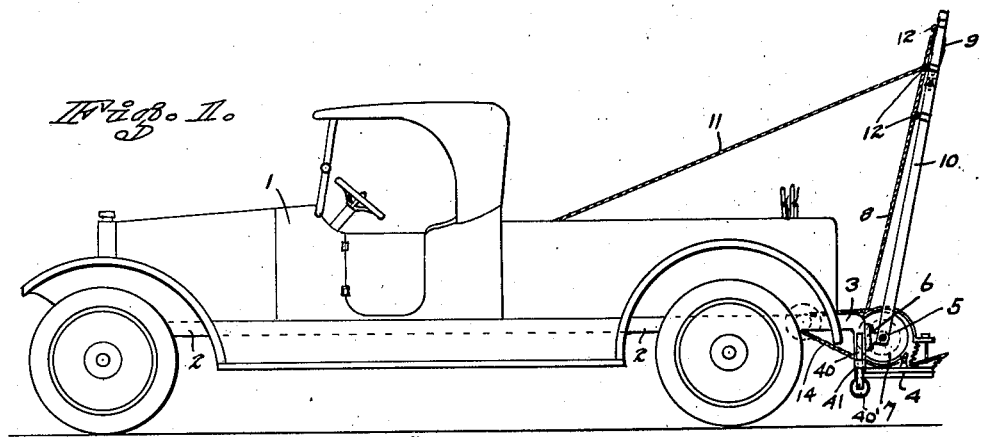
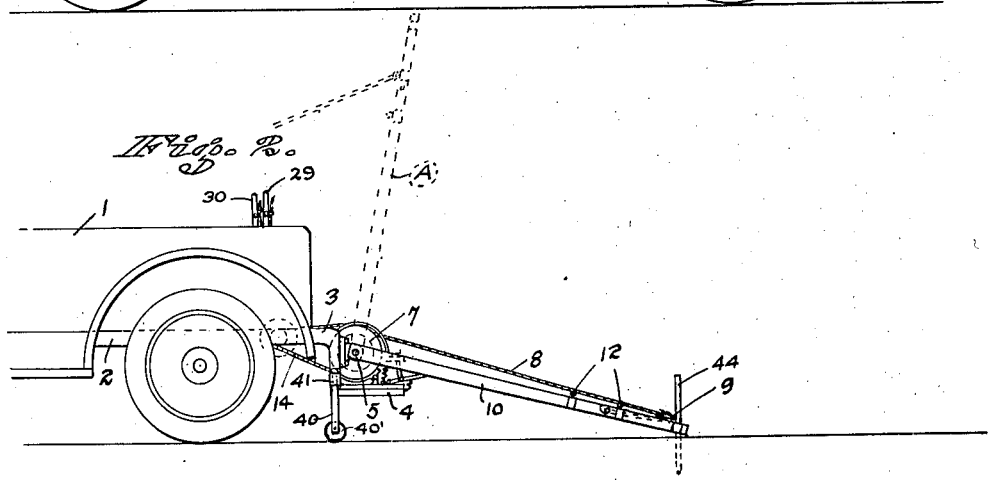
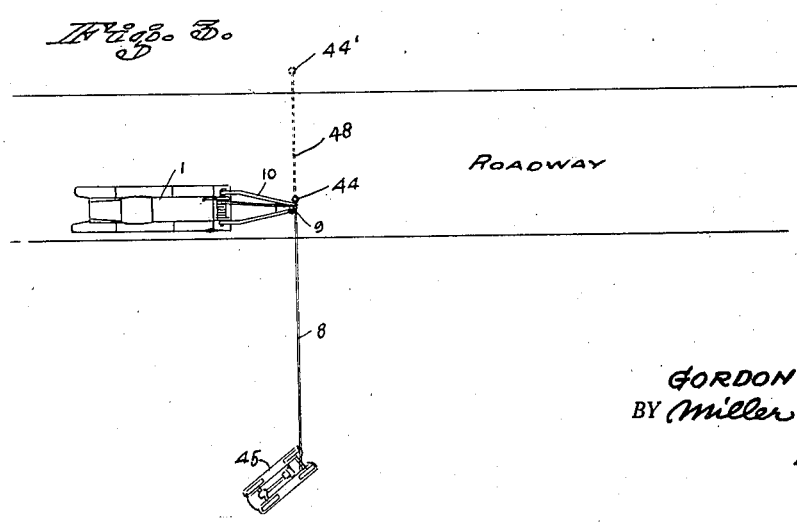
INVENTOR.
GORDON W. PAGE
BY Miller & Boyken
ATTORNEYS.

May 31, 1927.
G. W. PAGE
1,630,800
AUTOMOBILE WRECKING CAR
Filed May 4, 1926
2 Sheets-Sheet 2
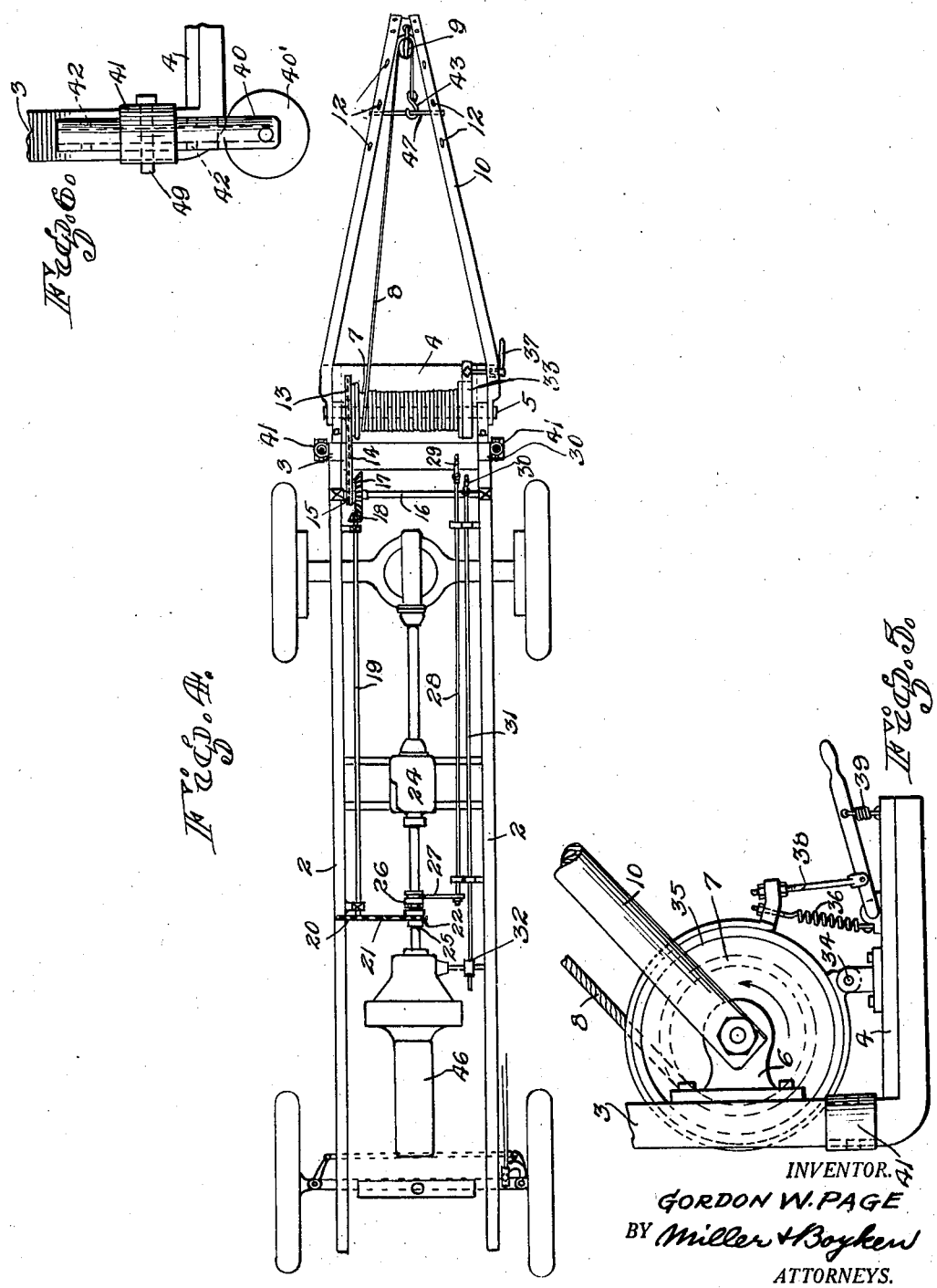
INVENTOR.
GORDON W. PAGE
BY Miller & Boyken
ATTORNEYS.

Patented May 31, 1927.

1,630,800

UNITED STATES PATENT OFFICE.

GORDON W. PAGE, OF SAN FRANCISCO, CALIFORNIA.

AUTOMOBILE WRECKING CAR.

Application filed May 4, 1926. Serial No. 106,634.

This invention relates to wrecking cars of the class where the wrecking equipment is mounted on an automobile body, and the invention has for its objects a special arrangement of wrecking hoist elements adapted for mounting on and cooperating with a common runabout type, or passenger car chassis, for effectively using the power of the automobile to actuate the wrecking elements.

Briefly described, my invention comprises a special hoist frame, hoist drum and control, mounted at the rear end of the chassis of an automobile operatively connected to its propeller drive shaft, and the installation of a clutch between said shaft and the hoist for control at the rear end of the chassis, together with additional means at the rear end of the chassis for throwing the regular clutch of the automobile.

Besides the above, the invention includes special control of the hoist drum at the rear end of the chassis and a frame mounting adapting the device to meet most all condition found in salvaging wrecked automobiles, especially such as have gone over the bank.

The drawings accompanying this application show my improved wrecking car in its preferred form, though it is to be understood that such changes as come within the spirit of the invention are intended to be covered in the claims.

In the drawings—Figure 1 is a side elevation of my wrecking car as it would appear going to a job with boom elevated.

Figure 2 shows the rear end of the car with boom lowered to the ground and held against displacement by means of a stake driven in the road.

Figure 3 is a plan of a highway with my car in position with boom anchored as in Figure 2 and with rope extended down embankment to salvage wrecked car.

Figure 4 is a general plan of the transmission elements shown in their relation to the chassis of the automobile.

Figure 5 is an enlarged end view of the drum unwinding control, and Figure 6 is an enlarged view of one of the adjustable feet under the hoist drum.

In further detail the drawings show at 1 an automobile, to the frame 2 of which is secured at the rear end a pair of L shaped extensions 3 supporting a shelf 4 on their lowermost portions, while above the shelf is a shaft 5 revolvably carried in bearings 6 secured to the extensions 3.

Secured to the shaft 5 is a hoist drum 7 on which the rope 8 is wound and the free end of which rope extends over a block 9 carried at the outer end of a boom 10. The boom comprises an A shaped frame, preferably of large diameter piping, and the lower ends of the frame are pivotally supported on the shaft 5 for lowering to various angles, and it is held in upright position by a pair of guy ropes 11 extending from the central part of the automobile and hooked to any of the rings 12.

At one end of the drum is a large sprocket 13 connected by a chain 14 to a small sprocket 15 on a countershaft 16 revolvably mounted on the frame 2, and a large bevel gear 17 also secured to the shaft 16 meshes with a bevel pinion 18 carried on a longitudinally extending shaft 19 revolvably supported by the frame 2 and carrying on its forward end a large sprocket 20 connected by a chain 21 to a small sprocket 22 mounted on the engine shaft 23 forward of the transmission gears 24. The sprocket 22 is free on shaft 23, being held from longitudinal shifting by collars or equivalent as at 25 and has clutch teeth formed on one side adapted to mesh with a jaw clutch 26 slidably feathered on the shaft 23 so as to throw the sprocket 22 into or out of engagement with the driving shaft 23 through operation of the clutch.

The clutch 26 is operated by means of a yoke extension 27 from a longitudinally movable rod 28 operated by a latching lever 29 at the rear end of the vehicle while a similar hand lever 30 operates a similar rod 31 suitably connected at its forward end at 32 to operate the regular engine clutch of the automobile conjointly with the clutch pedal of the vehicle. The unwinding of the drum is controlled by means of a special brake band arrangement shown in Figure 5, the band 33 being pivotally anchored at 34 to the shelf and after extending almost the full circumference of a braking flange 35 on the drum is resiliently pulled down by a spring 36, thus the band overlying more than half the circumference of the flange will automatically release in winding the drum in the direction of the arrow in pulling a load but will more tightly grip the band upon attempting reverse direction, and consequently will hold the load at any point upon shutting off the winding power.

To release the load for controlled unwinding of the rope, the band 33 is slackened off by means of a hand lever 37 linked to the band at 38 and normally pulled by means of a spring 39 in a direction to tighten the band. When hoisting a load the pressure is taken from the main road springs of the vehicle by a pair of adjustable feet 40 which are placed against the highway, the roller 40' permitting shifting of the vehicle with hoist loaded.

Figure 6 shows the preferred construction of the feet, each comprising a vertical pipe slidable through a collar 41 secured to the frame of the shelf 4, and provided with a series of holes 42, into which a pin 49 is inserted through a hole in the collar, and having a wide rimmed roller 40' mounted at the lower end adapted to transfer the pull of hoisting to the ground at a point rear of the common vehicle springs.

In operation, the vehicle is driven to the scene of the wreck with hoist frame elevated as shown in Figure 1, and if a mere hoisting job is required the boom is given a proper angle, as per dotted position A in Figure 2, by hooking the guy ropes 11 in the various rings 12. If a wreck must be pulled up an embankment, the boom is lowered to the road as shown in Figure 2, the easiest way to accomplish this being to engage the lifting hook 43 with the transverse brace 47 of the boom and permit the drum to unwind by releasing the drum control lever 37. The lowered end of the boom is suitably anchored by means of a stake 44 driven in the roadway, or if desired the stake may be driven in the earth beyond the roadway as at 44', and connected by a cable or chain 48 to the end of the boom.

The use of a stake in the manner described overcomes the danger of pulling the car out of place when hauling on a wreck as at 45 to get the same up from a gully, as it puts the strain directly on the stake.

Before operating the hoist the transmission of the car is put into neutral so that the drive shaft forward of this point is rotating under power of engine 46 without driving the vehicle, and to start the hoist, the regular clutch of the car is thrown out by means of hand lever 30 and the hoist mechanism engaged by operating the sprocket clutch lever 29, after which the car clutch may be let in slowly to start the load. To disengage the load either clutch may be thrown out, though the car clutch is the easiest to operate under heavy pulling as there is no load reaction tending to hold it engaged.

The boom may be lifted from the ground by engaging the hoisting hook with the brace rod 47 and upon gently starting the hoist drum the boom will rise to a position for attaching the guy ropes.

The speed of the hoist is controlled by the speed of the engine through the usual throttle of the vehicle not shown, but which is set at any intermediate speed at which the engine operates most efficiently as the speed of the hoist drum in wrecking work is of no great importance, the gearing being arranged to give the maximum power at an intermediate engine speed.

The rope extending from the drum may also be used for towing if desired as the brake arrangement 33 effectually prevents unwinding of the drum.

I claim:

1. An automobile wrecking car provided with extensions at the rear end of the chassis frame, a hoisting drum mounted on said extensions geared through a plurality of transmission elements to the engine of the vehicle, and a hoisting boom pivotally mounted at the rear of the vehicle on said extensions adapted for lowering of its outer end to the ground.

2. An automobile wrecking car provided with extensions at the rear end of the chassis frame, a hoisting drum mounted on said extensions geared through a plurality of transmission elements to the engine of the vehicle, a hoisting boom pivotally mounted on said extensions adapted for lowering of its outer end to the ground, and means for raising said boom through actuation of said drum.

3. In a structure as specified in claim 1, a pair of ground wheel supports for the rear end of the vehicle slidable vertically through guides, and means for locking said supports in adjusted position.

4. An automobile wrecking car provided with hoisting elements including a rope drum mounted at the rear end thereof, transmission elements connecting the rope drum for operation by the vehicle engine and including a jaw clutch for engaging a power shaft of said engine, a hand lever for operating said clutch positioned at the rear end of the vehicle accessible to an operator on the ground, and an adjacent lever connected for operating the main engine clutch of the vehicle.

GORDON W. PAGE.